United States Patent
Waud et al.

[15] 3,661,046
[45] May 9, 1972

[54] COMBINATION SCREW

[72] Inventors: Cornelius Byron Waud, Lake Forest; Ned J. Gruca, Dundee, both of Ill.

[73] Assignee: Illinois Tool Works Inc., Chicago, Ill.

[22] Filed: Nov. 9, 1970

[21] Appl. No.: 87,763

[52] U.S. Cl. .......................... 85/46, 85/1 JP, 277/166, 287/189.36 F
[51] Int. Cl. ........................ F16b 25/00, F16b 35/00
[58] Field of Search .......... 85/41, 46, 47, 1 JP, 1 R, 50 R; 287/189.36 F, 189.36 D; 277/166, 189; 52/584, 543; 151/7, 38, 37

[56] References Cited

UNITED STATES PATENTS

| | | | |
|---|---|---|---|
| 3,524,378 | 8/1970 | Wieber | 85/47 |
| 1,980,093 | 11/1934 | Rosenberg | 85/46 |
| 3,398,625 | 8/1968 | Ansingh | 85/46 |
| 3,478,639 | 11/1969 | Gruca | 85/41 |
| 3,500,712 | 3/1970 | Wagner | 85/1 JP |
| 2,382,019 | 8/1945 | Miller | 85/46 X |
| 3,109,691 | 11/1963 | Burkhardt | 85/46 X |

FOREIGN PATENTS OR APPLICATIONS

| | | | |
|---|---|---|---|
| 5,526 | 3/1910 | Great Britain | 85/1 JP |
| 690,269 | 4/1953 | Great Britain | 85/47 |

*Primary Examiner*—Ramon S. Britts
*Attorney*—Robert W. Beart, Michael Kovac and Jack R. Halvorsen

[57] ABSTRACT

A fastener unit for use in metal building construction in which a compressible sealing washer is used in combination with a threaded shank including a threaded portion of limited axial extent having a crest diameter substantially greater than the crest diameter of the remaining threads on the shank. The fastener unit is capable of being utilized to attach two relatively thin sheets of material while at the same time is configured in such a manner to be able to fasten a thin sheet of material to a structural member. The larger diameter threaded section pulls at least one sheet of material up towards the head of the fastener as the fastener is tightened and the sealing washer is compressed.

11 Claims, 6 Drawing Figures

PATENTED MAY 9 1972 3,661,046
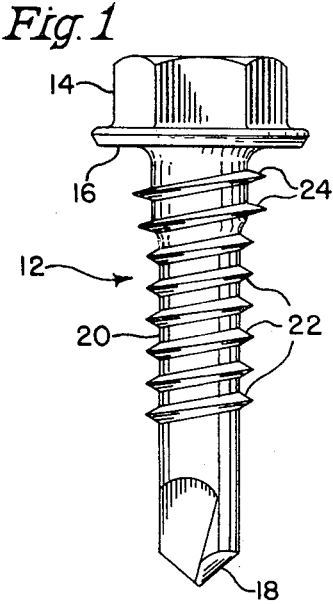
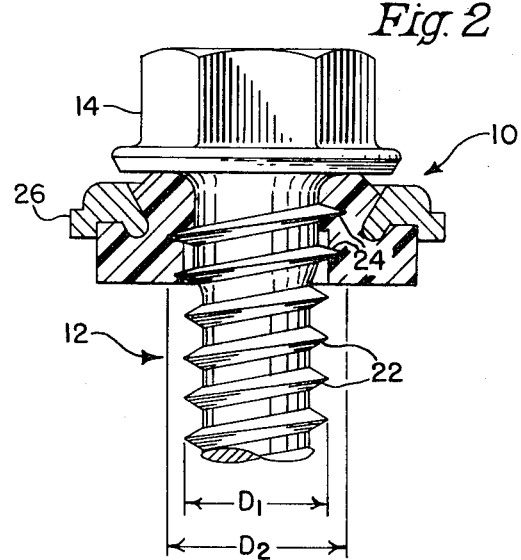
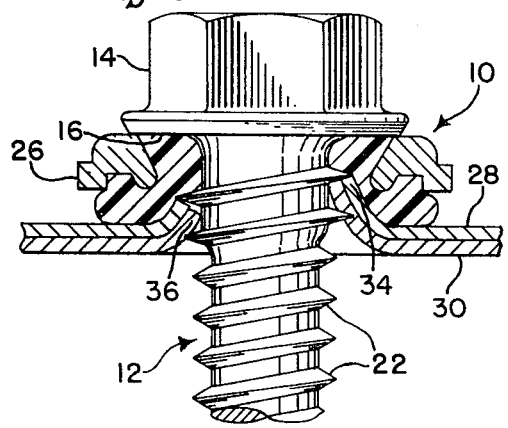
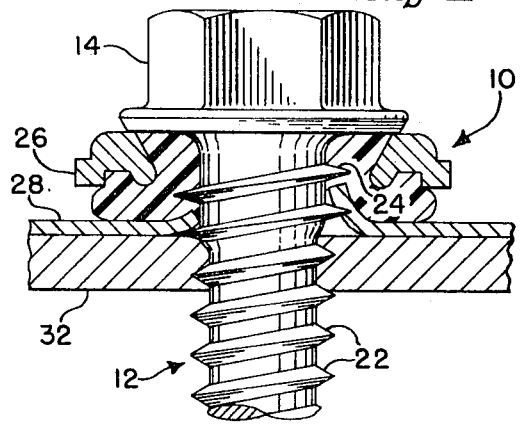
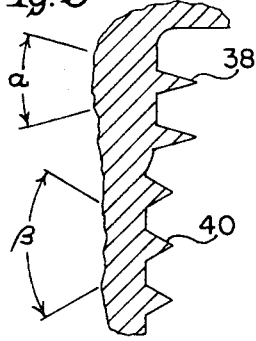
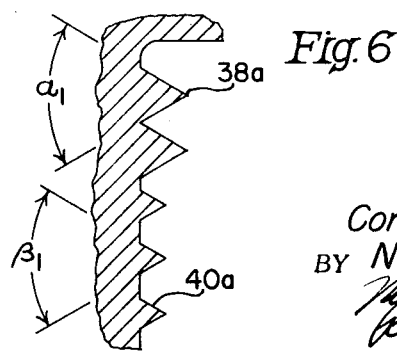
INVENTOR.
Cornelius Byron Waud
BY Ned J. Gruca
Their Att'ys 3,661,046

COMBINATION SCREW

BACKGROUND OF THE INVENTION

1. Field of the Invention

This invention relates generally to a threaded fastener and more particularly to a threaded fastener with sealing characteristics for use in metal building construction.

2. Description of the Prior Art

Sheet metal screws heretofore utilized to fasten components of a sheet metal building construction have been found to be generally inadequate to form a tight weatherproof joint due to the inherent tendency of such screws to strip in thin and medium gage sheet metal. Great difficulties have arisen in attempting to obtain a sealed fastening joint since the sheet metal screws were not capable of accepting relatively high torque.

Attempts have been made to remedy the stripping which occurs when attempting to apply large torque to a sheet metal workpiece. Screws having a tapered crest formation from point to head have been used to increase the torque capabilities of a fastener in sheet metal applications. This configuration is not suited for use in structural applications and thus is inconvenient for use by workmen in metal building applications. The sealing characteristics of such a screw are also still deficient due to the inability to manufacture a screw which has a thread immediately beneath the clamping surface of the head.

SUMMARY

It is an object of this invention to provide a fastener unit for use in metal buildings construction which is capable of receiving relatively large torque values without stripping an associated sheet metal workpiece.

It is still another object of the invention to provide a fastener unit which will effectively join sections of a metal building while at the same time provide a protective and tight seal for such a joint.

An important advantage of the present invention is the provision of a fastener unit which can interchangeably be used either to fasten two sheets of relatively thin material or to fasten a single sheet of thin material to a structural member, thus eliminating the use of a separate fastener for each function.

These and other objects of the invention are accomplished by providing a threaded fastener with an upper and lower thread portion, the upper threaded portion having a pitch diameter substantially greater than the pitch diameter of the lower section. The fastener unit further includes an associated compressible sealing washer. The high upper threaded portion has an axial extent directly related to the axial extent of the sealing washer in such a manner as to allow sheet material to be extruded or pulled upwardly towards the head thus creating a more effective seal and decreasing the probability of stripping the fastener in the sheet material. The high upper thread is also of such a dimension that the unit can alternately be utilized to fasten a sheet of material to a structural member without presenting substantial resistance to the entry of the threaded shank in the structural member.

The combination of the sealing washer with the high or upper threaded portion thus makes it possible to obtain an effective seal in sheet material environments where such a seal had previously been extremely difficult to obtain. The high thread portion provides an area onto which the sheet material can be extruded upwardly as the torque increases. The sealing washer alleviates some of the problems which have existed in previous sheet material screws due to the inability to roll thread convolutions immediately beneath the clamping face of the head.

Since it is generally desirable to have a single fastener for use in various operations, the fastener unit of the present invention is extremely desirable since it can be used to fasten either sheets of material together or a sheet of material to a structural member.

The foregoing objects, features and advantages will be apparent from the following more particular description of the invention, as illustrated in the accompanying drawings.

BRIEF DESCRIPTION OF THE DRAWINGS

FIG. 1 is a side elevational view of a screw fastener utilized in the present invention.

FIG. 2 is a fragmentary side elevation of the fastener unit showing the sealing washer in an uncompressed state.

FIG. 3 is a side elevational view of the unit of FIG. 2 in its final operational state when associated with two relatively thin sheet workpieces.

FIG. 4 is a side elevational view of the unit described in FIG. 2 in its final operational state when utilized in conjunction with an upper sheet workpiece and a lower structural workpiece.

FIG. 5 is an enlarged fragmentary sectional view of the fastener showing the preferred thread forms of both threaded portions.

FIG. 6 is an enlarged fragmentary sectional view similar to FIG. 5 but showing a modified thread form for the upper threaded portion.

DETAILED DESCRIPTION OF THE INVENTION

Turning now to the drawings wherein similar parts bear similar numerals, a screw 12 embodying the principles of the present invention would include a head 14 having a clamping face 16 thereunder and a threaded shank 20 including a first threaded portion 22 and a second threaded portion 24 and an entering point 18. The fastener unit 10 is shown in FIG. 2. The unit includes the screw 12 and a sealing washer 26 closely associated with the clamping face 16 and second threaded portion 24 of the screw.

The entering tip 18 is disclosed as a drilling point of the type disclosed in U.S. Pat. No. 3125923, but for purposes of the present invention drill tips of other configurations or entering points of various types can be used with equal facility. For example, types A, B, AB or their equivalent entering points can readily be utilized.

In the preferred embodiment, the axial extent of the first or upper portion of threads is determined by the axial extent of the associated sealing washer 26. The sealing washer shown is of the type disclosed in U.S. Pat. No. 3500712, however, sealing washers of various types can be used with generally similar effectiveness. As shown in FIG. 2 this axial extent of the high threads 24 does not generally exceed the uncompressed axial extent of the sealing washer. The high threads 24 could extend a short distance beyond the uncompressed sealing washer provided the interaction of the high threads does not prohibit the compression of the sealing washer. It is contemplated that a blanket of compressible insulation (not shown) could be placed between the sheet material 28 and the structural member 32. In this event, it is apparent that an additional extent of threads 24 of approximately one or two pitches beyond the axial extent of the uncompressed sealing washer would still produce an effective sealed joint. Likewise, should the axial extent of the high threads 24 be substantially less than the compressed height of the associated sealing washer, the sheets 28 would have difficulty in pulling up onto the high threads.

The major portion of the threaded shank 20 is comprised of the first or lower threaded portion 22. It can be seen from FIG. 2 that the crest diameter of the thread convolutions in the threaded portion 22, represented by D1, are uniform and substantially less than the crest diameter of the upper threaded portion 24, represented by D2. Thus, in the present embodiment, the crest diameter D2 is shown to be at least 10 percent greater than the crest diameter D1 for most effective operation of the invention.

FIGS. 3 and 4 depict the invention in two readily interchangeable environments. In FIG. 3 the fastener unit 10 is shown in its compressed state in association with two relatively thin sheet workpieces 28 and 30. The sheet material envisioned in FIG. 3 is generally that encountered in sheet metal building construction. Heretofore, fastening two sheets of this type of material has been extremely difficult due to the tendency of a fastener to strip the associated sheet workpieces. Therefore, it has been generally difficult to obtain a tight joint and seal in this environment.

FIG. 4 depicts the use of the present invention to fasten a relatively thin sheet workpiece 28 to a relatively large structural workpiece 32. The applications depicted in FIGS. 3 and 4 are those most readily encountered in sheet metal building construction and the present invention enables one fastener unit to be utilized in both applications with equal facility and efficiency.

In operation, the fastener unit 10 penetrates either two thin workpieces 28 and 30 or a thin workpiece 28 and a relatively large structural workpiece 32. The unit is thereafter torqued to a point which approaches the compressed state of the sealing washer 26. At this point, substantial further axial insertion of the unit into the panel is generally precluded. Further torque exerted on the unit allows the edges 34 and 36 of an aperture in sheet material 28 and 30 respectively, to "ride up" or be extruded up onto the high threads 24 of the fastener unit. The contact of the sheets 28 and 30 with the high threads 24 provide for increased resistance to stripping and thus forms an effectively sealed joint.

Should a workman desire to fasten a sheet of workpiece 28 to a structural beam or similar member 32, the fastener unit 10 can be utilized to produce a sealing joint depicted in FIG. 4. The unit 10 is utilized in the same manner as in joining two thin sheets. When the sealing washer 26 approaches its compressed state the sheet material 28 will be extruded upwardly onto the high threads 24. However, since the high threads 24 are of a limited axial extent, there will be no substantial contact between these high threads 24 and the structural member 32. Thus, as the unit 10 is essentially precluded from further axial movement, subsequent turning of the fastener 12 will force the thin workpiece 28 up onto the high threads 24 thus further compressing the innermost perimeter of the sealing washer 26. Due to the inherent resistance to stripping, which characterizes the present invention, the unit 10 can be subjected to relatively high torques and accompanying sealing effectiveness when joining together a sheet 28 and a structural member 32. It is important to note that should the high threads 24 extend appreciably beyond the uncompressed height of the sealing washer 26, the fastener 10 would encounter great resistance to any further penetration in the structural member 32. Any such resistance encountered in this environment will appreciably lessen the sealing effectiveness of a connection or joint.

Thus, it is readily apparent, from the operation described above, that a single fastener unit 10 can be utilized to form an effective sealing connection between two relatively thin sheets of material or form a sealing connection between a thin sheet of material and a structural member.

In accordance with the preferred embodiment of the invention, FIG. 5 shows a fragmentary enlarged sectional view of the thread forms of the invention. The high thread 38 can be formed with a thread angle $\alpha$ which is less than the thread angle $\beta$ of the lower thread 40. However, an alternate embodiment of the thread form utilized in the present invention can be seen in FIG. 6. High thread 38a may have a thread angle $\alpha_1$ which is the same as thread angle $\beta_1$ for low threads 40a. FIGS. 5 and 6, for illustrative purposes, show angles $\beta$, $\alpha_1$, and $\beta_1$ approximating the standard thread angle of 60°, while $\alpha$ is illustrated as approximating 30°.

While the invention is generally disclosed as incorporating two threaded portions having dissimilar crest diameters and dissimilar root diameters, the invention also contemplates threaded fasteners in which the two threaded portions have similar root diameters.

Pursuant to the invention, it is to be noted that proper operation of the invention necessitates that the two threaded portions be generally continuous so that the thin sheet material may be continuously extruded up onto the high thread portions 24. Therefore, the present invention is most efficiently operated when the upper and lower thread portions are continuous. The portions 24 and 22 are illustrated as having substantially similar helix angles. While this may be the more efficient configuration to produce, it is contemplated that fastener units which require different entry rates for each threaded portion may be desired. Thus, fastener units in which portion 24 has a different helix angle than portion 22 (not shown) are likewise contemplated in this invention.

Thus, it is apparent that there has been provided, in accordance with the invention, a fastener unit which is capable of providing an effectively sealed connection between two relatively thin sheet material workpieces and at the same time is capable of providing an effective sealed connection between a thin sheet of material and a large structural member. The above-described invention thus eliminates problems inherent in sheet metal building construction and providing a single fastener unit for use in most metal building applications.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the intended claims.

We claim:

1. A fastener unit for use in metal building construction comprising a screw in combination with a compressible sealing washer, the screw including a head, threaded shank and entering point, the threaded shank having a first portion of threads with a uniform crest diameter, a second portion of threads having a crest diameter greater than the crest diameter of the first portion, the second portion leading into the first portion to present a continuous set of thread convolutions on the shank, the second portion of threads extending downwardly from a clamping surface on the head for a limited axial extent, the axial extent of the second portion generally not exceeding the uncompressed axial extent of the sealing washer, whereby the fastener can be used to fasten two relatively thin sheets of material by pulling the sheets up the axis of the shank onto the threads of the second portion, while also being capable of attaching a thin sheet of material to a thicker piece of material without substantial resistance between the fastener and the thicker piece of material.

2. A fastener unit as set forth in claim 1 wherein the first and second portion of threads have different root diameters and a constant helix angle.

3. A fastener unit as set forth in claim 1 wherein the second portion of threads has a crest diameter at least 10 percent greater than the crest diameter of the first portion.

4. A fastener unit as set forth in claim 1 wherein the first and second thread portions have the same thread angle.

5. A fastener unit as set forth in claim 1 wherein the first and second thread portions have different thread angles.

6. A fastener unit as set forth in claim 1 wherein the axial extent of the second portion is substantially equal to the uncompressed axial extent of the associated sealing washer.

7. A fastener unit comprising a screw having a head with a clamping face thereunder and a threaded shank portion, a compressible sealing washer operatively associated with the screw underneath the clamping face, the threaded shank portion including an upper and lower axial portion of threads, the upper portion of threads leading into the lower portion thereby forming continuous thread convolutions throughout the threaded shank portion, the lower portion having a substantially uniform crest diameter, the upper portion having a crest diameter greater than the crest diameter of the lower portion and having an axial extent greater than the axial extent of the compressed sealing washer but not substantially exceeding the axial extent of the uncompressed sealing washer whereby the fastener unit is adapted to either fasten a pair of relatively thin sheets of material or fasten a thin sheet of material to a thicker piece of construction material while retaining a high degree of sealing between the unit and the materials to be fastened.

8. A fastener unit as set forth in claim 7 wherein the axial extent of the upper portion is approximately equal to the uncompressed axial extent of the sealing washer.

9. In a metal building construction section, the combination comprising a threaded fastener having a shank and a head with a clamping surface thereunder, a compressible sealing washer located beneath the clamping surface, at least one workpiece of relatively thin material, the shank of the fastener having axially upper and lower threaded portions forming a continuous thread convolution, the lower portion of threads having a uniform crest diameter, the upper portion of threads having a larger crest diameter than said lower portion, the axial length of the upper portion being greater than the compressed height of the sealing washer but not substantially exceeding the uncompressed height of the sealing washer, whereby the fastener is driven through the workpiece to such an extent as to compress the washer while the upper portion of threads contacts and extrudes the workpiece upwardly toward the clamping surface in such a manner as to further compress the inner peripheral portion of the sealing washer thus enhancing the sealing characteristics of the building section.

10. A building section as set forth in claim 8 which includes a relatively rigid structural member positioned behind the relatively thin material in such a manner as to retain a closely juxtaposed position thereto thus enabling the section to be tightly sealed upon the tightening of the threaded fastener.

11. A building section as set forth in claim 8 which includes a second workpiece of relatively thin sheet material immediately beneath the first workpiece, said second workpiece being extruded up onto the upper portion of threads upon tightening the fastener to such an extent as to compress the sealing washer, the second workpiece thereby placing additional axial stress on the undersurface of the first workpiece and the inner periphery of the sealing washer thus increasing the sealing characteristics of the building section.

* * * * *